US011769095B2

(12) United States Patent
Smith et al.

(10) Patent No.: US 11,769,095 B2
(45) Date of Patent: Sep. 26, 2023

(54) COGNITIVE EVALUATION OF ACQUISITION CANDIDATES

(71) Applicant: International Business Machines Corporation, Armonk, NY (US)

(72) Inventors: Casey Smith, Chicago, IL (US); Mark Davis Burkhead, Atlanta, GA (US); Fang Lu, Billerica, MA (US); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 34 days.

(21) Appl. No.: 17/224,660

(22) Filed: Apr. 7, 2021

(65) Prior Publication Data
US 2022/0327446 A1 Oct. 13, 2022

(51) Int. Cl.
*G06Q 10/0635* (2023.01)
*G06F 16/9538* (2019.01)
(Continued)

(52) U.S. Cl.
CPC ..... *G06Q 10/0635* (2013.01); *G06F 16/9538* (2019.01); *G06F 40/205* (2020.01);
(Continued)

(58) Field of Classification Search
CPC ............ G06Q 10/0635; G06Q 10/0637; G06F 16/9538; G06F 40/279; G06F 40/205; G06V 30/40; G06N 20/00
(Continued)

(56) References Cited

U.S. PATENT DOCUMENTS 11,120,380 B1* 9/2021 Narala ................ G06F 16/2458
2001/0037213 A1 11/2001 Kinoshita
(Continued)

FOREIGN PATENT DOCUMENTS

JP    2017078985 A    4/2017
JP       6640161 B2   2/2020

OTHER PUBLICATIONS

V. Bhagwan "Systematic Review of the Due Diligence Stage of Mergers and Acquisitions" South African Journal of Industrial Engineering Nov. 2018 vol. 29(3) Special Edition, pp. 217-234. (Year: 2018).*

(Continued)

*Primary Examiner* — Abdallah A El-Hage Hassan
(74) *Attorney, Agent, or Firm* — Garg Law Firm, PLLC; Rakesh Garg; Michael O'Keefe

(57) ABSTRACT

An embodiment includes initiating a search engine to conduct a first search of a data resource for information associated with an acquisition candidate using search criteria provided via a user interface. The embodiment receives a first search result from the search engine comprising an information dataset associated with the acquisition candidate. The embodiment generates a candidate rating for the acquisition candidate indicative of a performance metric for the acquisition candidate relative to another acquisition candidate. The embodiment initiates the search engine to conduct a second search of the data resource using search criteria extracted from the information dataset. The embodiment receives a second search result from the search engine comprising due-diligence data. The embodiment calculates an updated candidate rating for the acquisition candidate based on the cognitive analysis of the due-diligence data and uses the updated rating to provide a recommendation regarding the acquisition candidate.

19 Claims, 6 Drawing Sheets

(51) Int. Cl.
   *G06Q 10/0637* (2023.01)
   *G06F 40/205* (2020.01)
   *G06F 40/279* (2020.01)
   *G06V 30/40* (2022.01)
   *G06N 20/00* (2019.01)

(52) U.S. Cl.
   CPC ....... *G06F 40/279* (2020.01); *G06Q 10/0637* (2013.01); *G06V 30/40* (2022.01); *G06N 20/00* (2019.01)

(58) Field of Classification Search
   USPC ....................................................... 705/7.28
   See application file for complete search history.

(56) References Cited

U.S. PATENT DOCUMENTS

| | | | |
|---|---|---|---|
| 2002/0046187 A1 | 4/2002 | Vargas et al. | |
| 2002/0169658 A1* | 11/2002 | Adler | G06Q 10/06 705/7.29 |
| 2005/0096948 A1* | 5/2005 | Chen | G06Q 10/06315 705/7.28 |
| 2007/0100724 A1* | 5/2007 | Hollas | G06Q 40/00 705/36 R |
| 2008/0183529 A1 | 7/2008 | Berman et al. | |
| 2008/0270314 A1 | 10/2008 | Birney et al. | |
| 2009/0019083 A1* | 1/2009 | Bacon | G06Q 10/00 |
| 2010/0262466 A1* | 10/2010 | Smith | G06Q 30/0203 707/802 |
| 2011/0295759 A1* | 12/2011 | Selvakummar | G06Q 10/1053 705/321 |
| 2014/0012614 A1* | 1/2014 | Beresford-Wood | G06Q 50/01 705/7.15 |
| 2022/0067625 A1* | 3/2022 | Jannak | G06Q 10/06375 |

OTHER PUBLICATIONS

Makrygiannis, EY platform hosted on IBM Cloud and using IBM Watson Discovery to reframe the future of M&A due diligence, Dec. 3, 2020, https://www.ey.com/en_gl/news/2020/12/ey-platform-hosted-on-ibm-cloud-and-using-ibm-watson-discovery-to-reframe-the-future-of-m-a-due-diligence.

Wikipedia, List of mergers and acquisitions by IBM, 2021, https://en.wikipedia.org/wiki/List_of_mergers_and_acquisitions_by_IBM.

IBM, IBM M&A Accelerator, 2021, https://www.ibm.com/services/merger-acquisition.

* cited by examiner

COGNITIVE EVALUATION OF ACQUISITION CANDIDATES

BACKGROUND

The present invention relates generally to a method, system, and computer program product for cognitive processing. More particularly, the present invention relates to a method, system, and computer program product cognitive evaluation of acquisition candidates.

An acquisition is the purchase of one business or company by another company or other business entity. Often a company will seek to acquire another company as part of an effort to expand their market presence or geographic reach. Other common reasons include acquisition of assets or expertise and mitigation of risk involved in entering a new product market.

The process of acquiring another company tends to be complex and time-consuming. A typical business acquisition process can take anywhere from six months to several years to complete. The level of difficulty associated with completing a business acquisition is significant, resulting in only about half of attempted acquisitions being successful.

Candidate valuation and due diligence are important part of a business acquisition process. Business acquisitions often involve a considerable amount of risk for the acquiring entity. For example, the purchasing party risks inheriting unforeseen contractual obligations, liabilities, and litigation risks of the acquired entity. Valuation and due diligence processes are performed to gather information about the acquisition candidate to help mitigate these risks.

SUMMARY

The illustrative embodiments provide for cognitive evaluation of acquisition candidates. An embodiment includes initiating a search engine to conduct a first search of a data resource for information associated with a first acquisition candidate using search criteria provided via a user interface. The embodiment also includes receiving a first search result from the search engine comprising an information dataset associated with the acquisition candidate. The embodiment also includes generating a candidate rating for the first acquisition candidate indicative of a performance metric for the first acquisition candidate relative to a second acquisition candidate. The embodiment also includes initiating the search engine to conduct a second search of the data resource for information associated with the first acquisition candidate using search criteria extracted from the information dataset associated with the acquisition candidate. The embodiment also includes receiving a second search result from the search engine comprising due-diligence data. The embodiment also includes calculating an updated candidate rating for the first acquisition candidate based on a cognitive analysis of the due-diligence data. The embodiment further includes presenting, via the user interface, a recommendation regarding the first acquisition candidate, wherein the recommendation is based on the updated candidate rating and a return-on-investment analysis associated with acquiring the first acquisition candidate. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
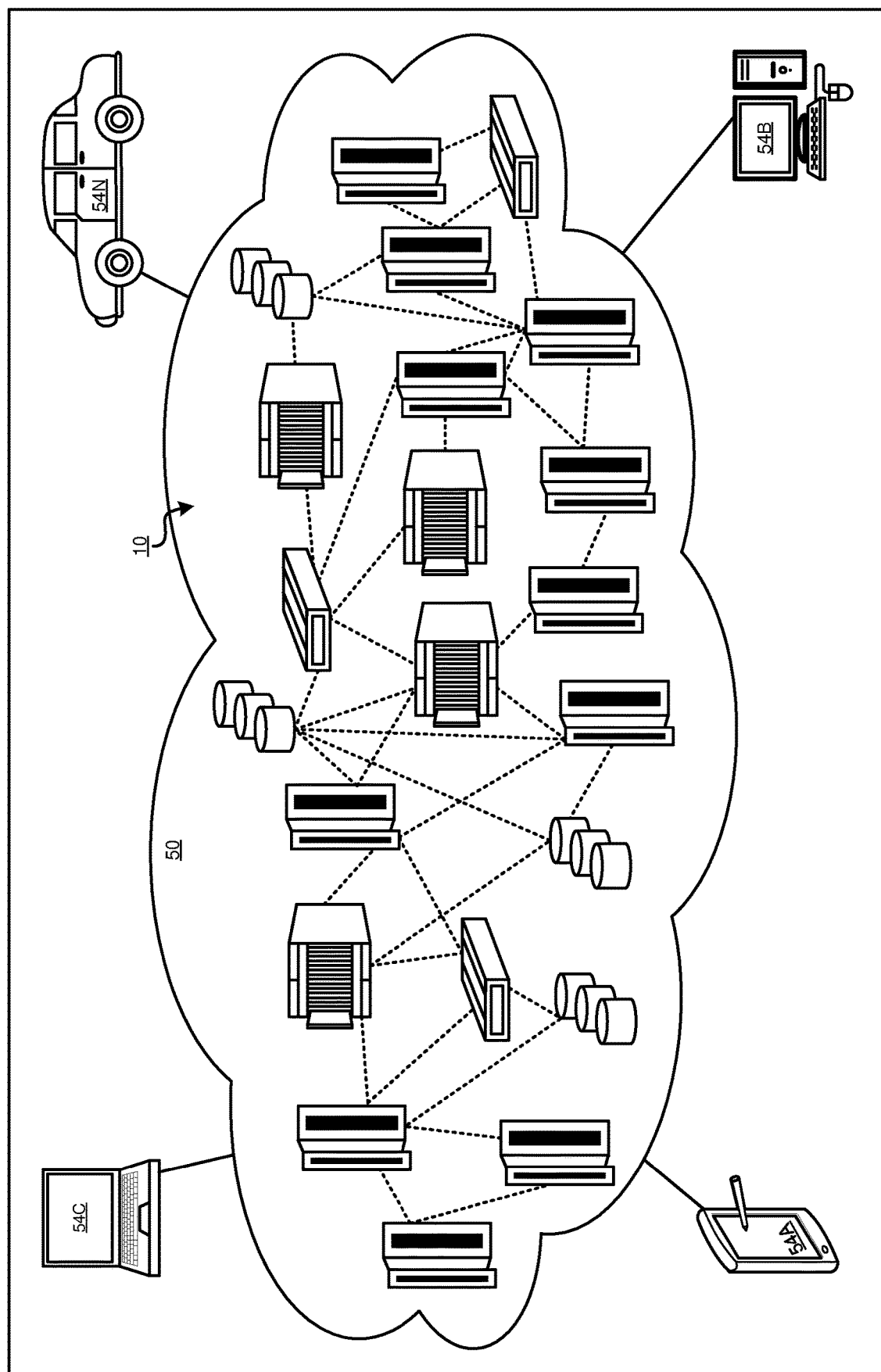
FIG. 1 depicts an illustrative cloud computing environment.

The process of identifying and sourcing candidates for acquisition, going through the due diligence review, and purchasing the company, is long, arduous, and extremely time consuming. In addition, the vast majority of companies have no line of sight into post acquisition metrics such as speed to onboard, acquisition performance, and return on investment (ROI). A conventional approach to performing due diligence in such situations may be fairly static where the documents are physically placed into one physical or "digital" room. However, due to the huge volume of documents associated with acquisition research and due diligence, some of the information may be missed, overlooked, or otherwise not discovered during the research and due diligence phases of an acquisition.

Additionally, a team for a given transaction may contain members who are geographically distant from one another. In an environment where work requires a lot of paper, and paper documents are examined, communication can break down between members of the team because of geography.

Accordingly, the present embodiments recognize that it is desirable to provide a system that provides cognitive evaluation of information associated with an acquisition candidate. Such a system advantageously leverages artificial intelligence as part of the research and due diligence process to help reduce human error that might otherwise result in information being overlooked.

In an exemplary embodiment, an acquisition management system analyzes an acquisition candidate's information, such as financial performance, online presences (accounts, assets), workforce size, type of industry, market data (price and trade-related data for a financial instrument reported by a trading venue such as a stock exchange). For example, in some embodiments, the acquisition management system initiates a search engine to conduct a search of a data resource for information associated with the acquisition candidate using search criteria provided via a user interface.

In some embodiments, the acquisition management system receives a search result from the search engine comprising an information dataset associated with the acquisition candidate. Embodiments of the search engine may include local and/or remote search engine functionality. For example, embodiments of the search engine may include a local proprietary search engine and/or a remote third-party search engine.

In some embodiments, the information dataset includes a plurality of information categories, for example a financial performance category, an online presence category (comprising accounts, assets), a workforce statistics category (comprising workforce number/types), an industry category, and a market data category (comprising price and trade-related data for a financial instrument reported by a trading venue such as a stock exchange).

In some embodiments, the acquisition management system generates a candidate rating for the acquisition candidate indicative of a performance metric for the first acquisition candidate relative to a second acquisition candidate. In some embodiments, the candidate rating is based on a plurality of candidate sub-ratings for the first acquisition candidate, wherein each of the plurality of candidate sub-ratings is associated with a respective one of the plurality of information categories. In some embodiments, the acquisition management system presents, via the user interface, the candidate rating for the acquisition candidate. In some embodiments, the acquisition management system presents, via the user interface, the plurality of candidate sub-ratings and associated information categories for the first acquisition candidate. In some embodiments, the acquisition management system receives, via the user interface, a selection of the acquisition candidate for further research.

In some embodiments, the acquisition management system uses a predefined checklist based on the characteristics of the acquisition candidate. In some embodiments, the acquisition management system generates, responsive to receiving the selection of the acquisition candidate, a predefined checklist that includes a list of one or more due-diligence tasks from a repository of predefined tasks or task templates.

In some embodiments, the acquisition management system uses collected data from the search results as input parameters for a cognitive analysis, and the acquisition management system conducts detailed searches based on the input parameters. For example, in some embodiments, the acquisition management system initiates the search engine to conduct another search of the data resource for information associated with the first acquisition candidate using search criteria extracted from the information dataset associated with the acquisition candidate. In some embodiments, the acquisition management system receives search results from the search engine, where the search results constitute due-diligence data associated with one or more of the due-diligence tasks on the due-diligence requirements checklist.

In some embodiments, the acquisition management system uses one or more different data parsing and analysis techniques to process the search results. For example, in some embodiments, the acquisition management system performs cognitive analysis that includes natural language processing (NLP) of a natural language portion of the due-diligence data, image analysis of an image included in the due-diligence data, and/or speech data analysis of audio from audio and/or video included in the due-diligence data.

In some embodiments, the acquisition management system assigns a weight for each of the information categories. In some embodiments, the acquisition management system derives a percentage of the items that the acquisition candidate has satisfied from the due-diligence requirements checklist.

In some embodiments, the acquisition management system calculates updated scores for the acquisition candidate for each of the information categories and adjusts the scores based on the weight assigned to each category. For example, in some embodiments, the acquisition management system calculates an updated candidate rating for the first acquisition candidate based on the cognitive analysis of the due-diligence data. In some such embodiments, the acquisition management system calculates the updated candidate rating based on updated candidate sub-ratings for the acquisition candidate, where each of the updated candidate sub-ratings is associated with a respective information category. In some such embodiments the updated candidate sub-ratings are based on a cognitive analysis of the due-diligence data and the weight assigned to the associated information category.

In some embodiments, the acquisition management system makes recommendations based on the calculated scores. In some embodiments, the acquisition management system presents, via the user interface, a recommendation regarding the acquisition candidate based on the updated candidate rating. In some embodiments, the acquisition management system presents a recommendation further based on a return-on-investment analysis associated with acquiring the acquisition candidate.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)s).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this Figure depicts an illustrative cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
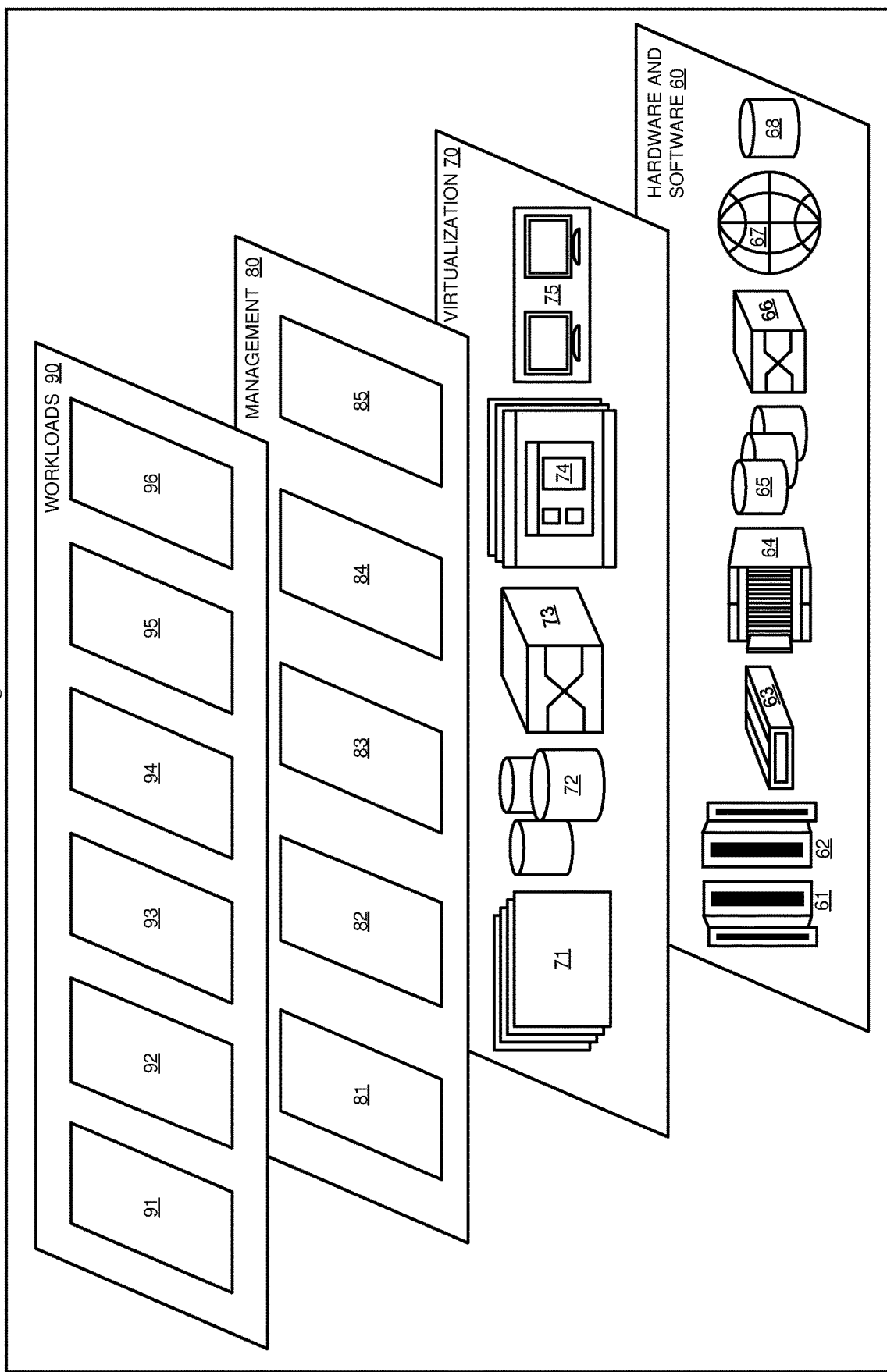
FIG. 2 depicts a set of functional abstraction layers provided by a cloud computing environment.

With reference to FIG. 2, this Figure depicts a set of functional abstraction layers provided by cloud computing environment 50 (FIG. 1) is shown. It should be understood in advance that the components, layers, and functions shown in FIG. 2 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and acquisition management system 96. The acquisition management system 96 may be enabled to provide cognitive analysis of an acquisition candidate and provide an acquisition recommendation.

Figure 3:
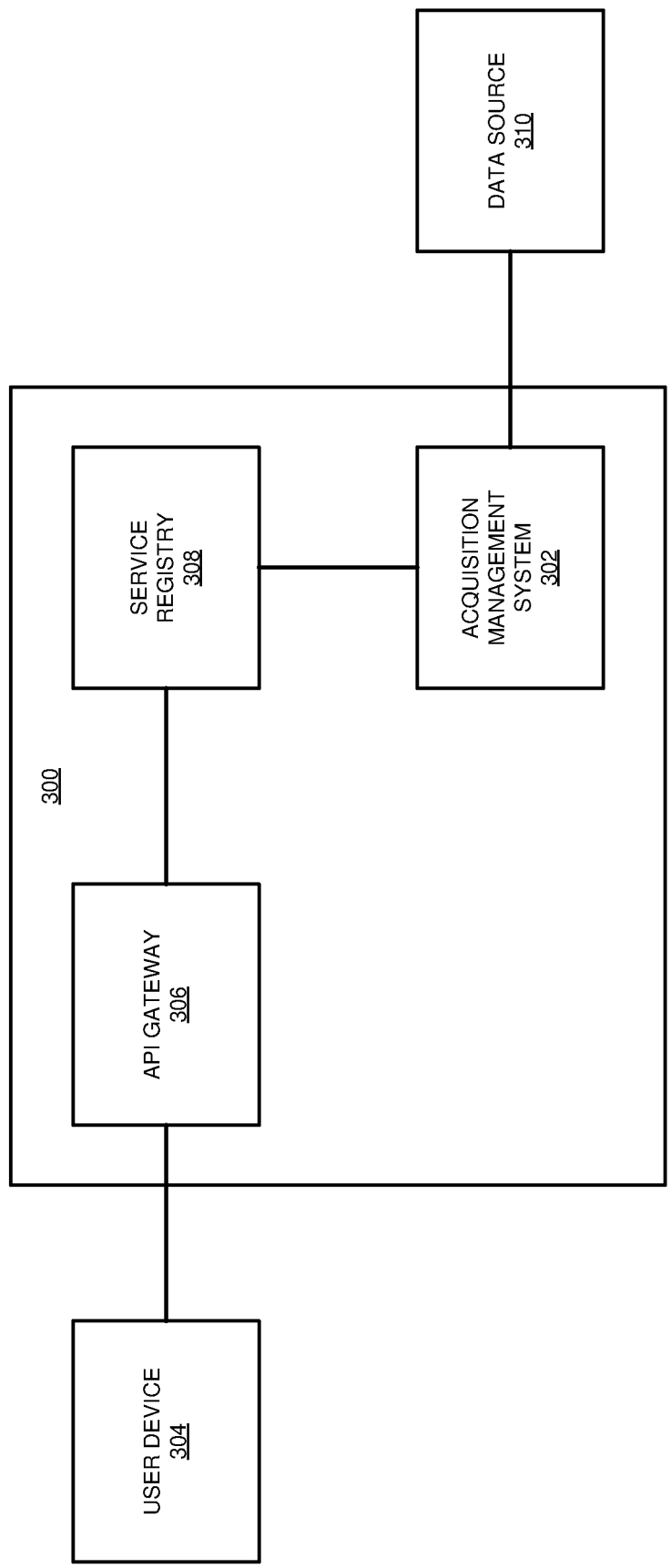
FIG. 3 depicts a block diagram of an example service infrastructure that includes an acquisition management system in accordance with an illustrative embodiment.

With reference to FIG. 3, this figure depicts a block diagram of an example service infrastructure 300 that includes an acquisition management system 302 in accordance with an illustrative embodiment. In the illustrated embodiment, the acquisition management system 302 it will include the ability to review the performance of acquisitions based on standard and custom metrics in a centralized hub. It will make intelligent recommendations based on scorecards defined by the individual client In some embodiments, the acquisition management system 302 is deployed in workloads layer 90 of FIG. 2. By way of example, in some embodiments, acquisition management system 302 is implemented as acquisition management system 96 in FIG. 2.

In an exemplary embodiment, the service infrastructure 300 provides services and service instances to a user device 304, including services and service instances associated with the acquisition management system 302. In some embodiments, the acquisition management system 302 conducts a search of data source 310 for information associated with one or more acquisition candidates. The acquisition management system 302 calculates a rating for each of the acquisition candidates based on the search results and presents the rating(s) via a user interface, for example as a candidate scorecard. The acquisition management system 302 allows for selection of an acquisition candidate via the user interface. The acquisition management system 302 then proceeds with more detailed searching and cognitive analysis of the search results, and provides an acquisition recommendation based on the results of the cognitive analysis.

In the illustrated embodiment, the user device 304 communicates with service infrastructure 300 via an API gateway 306. In various embodiments, service infrastructure 300 and its associated acquisition management system 302 serve multiple users and multiple tenants. A tenant is a group of users (e.g., a company) who share a common access with specific privileges to the software instance. Service infrastructure 300 ensures that tenant specific data is isolated from other tenants.

In the illustrated embodiment, service infrastructure 300 includes a service registry 308. In some embodiments, service registry 308 looks up service instances of acquisition management system 302 in response to a service lookup request such as one from API gateway 306 in response to a service request from user device 304. For example, in some embodiments, the service registry 308 looks up service instances of acquisition management system 302 in response to requests related to acquisition management from the user device 304.

In some embodiments, the service infrastructure 300 includes one or more instances of the acquisition management system 302. In some such embodiments, each of the multiple instances of the acquisition management system 302 run independently on multiple computing systems. In some such embodiments, acquisition management system 302, as well as other service instances of acquisition management system 302, are registered in service registry 308.

In some embodiments, service registry 308 maintains information about the status or health of each service instance including performance information associated each of the service instances. In some such embodiments, such information may include various types of performance characteristics of a given service instance (e.g., cache metrics, etc.) and records of updates.

In some embodiments, user device 304 connects with API gateway 306 via any suitable network or combination of networks such as the Internet, etc. and uses any suitable communication protocols such as Wi-Fi, Bluetooth, etc. Service infrastructure 300 may be built on the basis of cloud computing. API gateway 306 provides access to client applications like acquisition management system 302. API gateway 306 receives service requests issued by client applications and creates service lookup requests based on service requests. As a non-limiting example, in an embodiment, the user device 304 executes a routine to initiate interaction with the acquisition management system 302. For instance, in some embodiments, the user accesses the acquisition management system 302 directly using a command line or GUI to initiate, monitor, or check the status of a cognitive analysis of an acquisition candidate. Also, in some embodiments, the user accesses the acquisition management system 302 indirectly through the use of a web application that interacts with the acquisition management system 302 via the API gateway 306.

Figure 4:
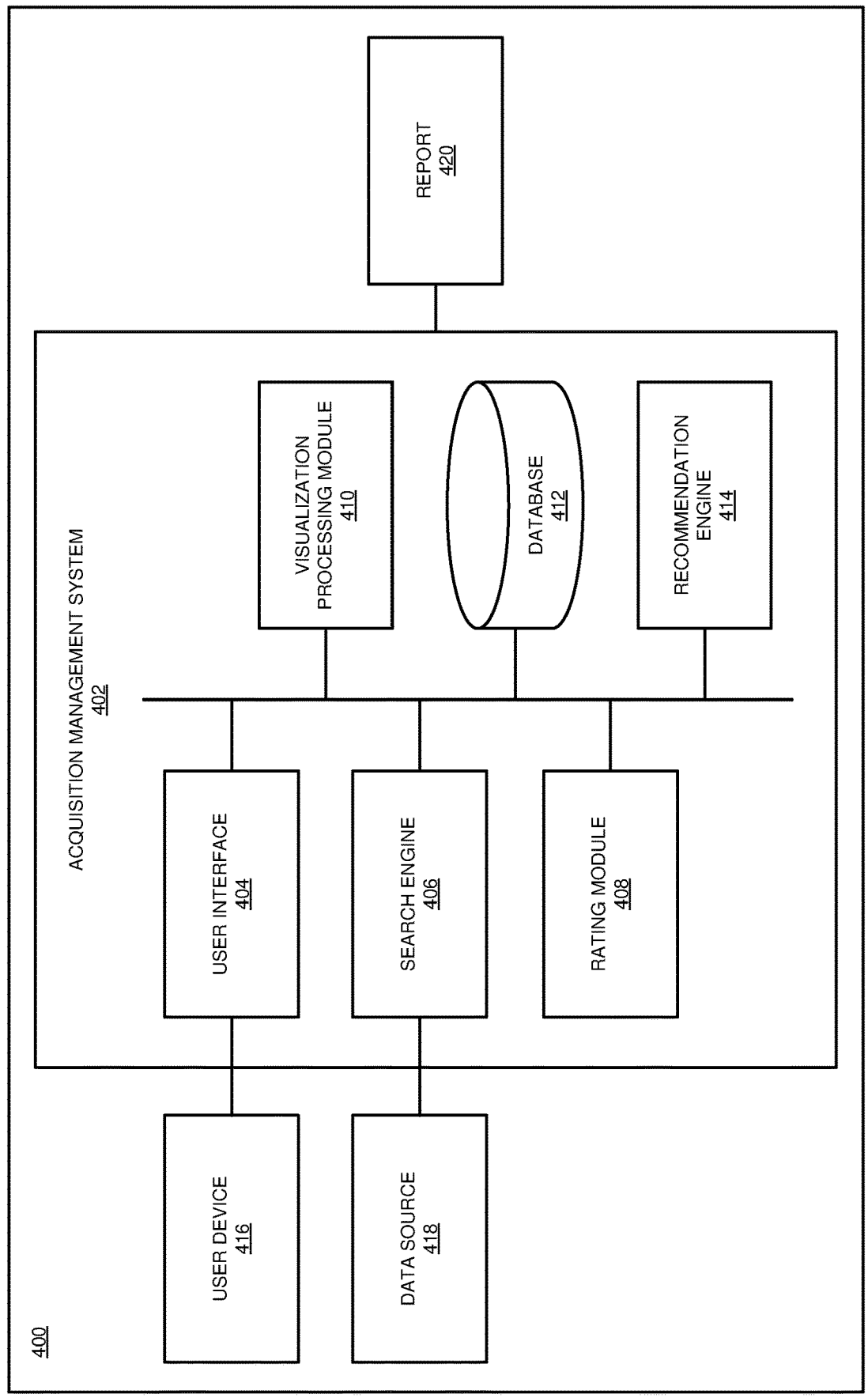
FIG. 4 depicts a block diagram of an exemplary system that includes an acquisition management system in accordance with an illustrative embodiment.

With reference to FIG. 4, this figure depicts a block diagram of an exemplary system 400 that includes an acquisition management system 402 in accordance with an illustrative embodiment. In an exemplary embodiment, the acquisition management system 402 is an example of the acquisition management system 302 of FIG. 3.

In some embodiments, the acquisition management system 402 includes a user interface 404, a search engine 406, a rating module 408, a visualization processing module 410, a database 412, and a recommendation engine 414. In alternative embodiments, the acquisition management system 402 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In an exemplary embodiment, the acquisition management system 402 analyzes an acquisition candidate's information, such as financial performance, online presences (accounts, assets), size of workforce, type of industry, market data (price and trade-related data for a financial instrument reported by a trading venue such as a stock exchange). The acquisition management system 402 interacts with one or more users via the user interface 404, which receives input from, and provides output to, a user device 416. The local computing devices shown in FIG. 1, for example personal digital assistant (PDA) or cellular telephone 54A, desktop computer 54B, laptop computer 54C, and/or automobile computer system 54N, are non-limiting examples of the user device 416. In some embodiments, the acquisition management system 402 initiates the search engine 406 to conduct a search of a data resource, shown generally as data source 418, for information associated with the acquisition candidate using search criteria provided via the user interface 404. Embodiments of the search engine 406 may include local and/or remote search engine functionality. For example, embodiments of the search engine 406 may include a local proprietary search engine and/or a remote third-party search engine.

In some embodiments, the acquisition management system 402 receives a search result from the search engine 406 comprising an information dataset associated with the acquisition candidate. In some embodiments, the acquisition management system 402 stores the search results in database 412. In some embodiments, the information dataset includes a plurality of information categories, for example a financial performance category, an online presence category (comprising accounts, assets), a workforce statistics category (comprising workforce number/types), an industry category, and a market data category (comprising price and trade-related data for a financial instrument reported by a trading venue such as a stock exchange).

In some embodiments, the rating module 408 uses the search results stored in database 412 to generate a candidate rating for the acquisition candidate indicative of a performance metric for the first acquisition candidate relative to a second acquisition candidate. In some embodiments, the rating module 408 calculates the candidate rating based on one or more business rules. In some embodiments, the business rules may include rules provided or configured by a user. In some embodiments, the rating module 408 calculates the candidate rating base on a plurality of candidate sub-ratings for the first acquisition candidate. For example, in some embodiments, the rating module 408 calculates one or more sub-ratings, where each sub-rating is associated with a respective information category. For example, un some embodiments, the rating module 408 calculates the candidate rating based on one or more business rules.

In some embodiments, the visualization processing module 410 presents, via the user interface 404, the candidate rating for the acquisition candidate. In some embodiments, the visualization processing module 410 presents, via the user interface 404, the plurality of candidate sub-ratings and associated information categories for the first acquisition candidate. In some embodiments, the acquisition management system 402 receives, via the user interface 404, a selection of the acquisition candidate for further research.

In some embodiments, the acquisition management system 402 uses a predefined checklist based on the characteristics of the acquisition candidate. In some embodiments, the acquisition management system 402 generates, responsive to receiving the selection of the acquisition candidate, a predefined checklist that includes a list of one or more due-diligence tasks from a repository of predefined tasks or task templates.

In some embodiments, the recommendation engine 414 uses collected data from the search results as input parameters for a cognitive analysis, and the recommendation engine 414 conducts detailed searches based on the input parameters. For example, in some embodiments, the recommendation engine 414 initiates the search engine 406 to conduct another search of the data source 418 for information associated with the first acquisition candidate using search criteria extracted from the information dataset associated with the acquisition candidate. In some embodiments, the recommendation engine 414 receives search results from the search engine 406, where the search results constitute due-diligence data associated with one or more of the due-diligence tasks on the due-diligence requirements checklist.

In some embodiments, the recommendation engine 414 uses one or more different data parsing and analysis techniques to process the search results. For example, in some embodiments, the recommendation engine 414 performs cognitive analysis that includes natural language processing (NLP) of a natural language portion of the due-diligence data, image analysis of an image included in the due-diligence data, and/or speech data analysis of audio from audio and/or video included in the due-diligence data.

In some embodiments, the recommendation engine 414 assigns a weight for each of the information categories. In some embodiments, the recommendation engine 414 derives a percentage of the items that the acquisition candidate has satisfied from the due-diligence requirements checklist.

In some embodiments, the recommendation engine 414 calculates updated scores for the acquisition candidate for each of the information categories and adjusts the scores based on the weight assigned to each category. For example, in some embodiments, the recommendation engine 414 calculates an updated candidate rating for the first acquisition candidate based on the cognitive analysis of the due-diligence data. In some such embodiments, the recommendation engine 414 calculates the updated candidate rating based on updated candidate sub-ratings for the acquisition candidate, where each of the updated candidate sub-ratings is associated with a respective information category. In some such embodiments the updated candidate sub-ratings are based on a cognitive analysis of the due-diligence data and the weight assigned to the associated information category.

In some embodiments, the acquisition management system 402 makes recommendations based on the calculated scores. In some embodiments, the visualization processing module 410 presents, via the user interface 404, a recommendation regarding the acquisition candidate based on the updated candidate rating. In some embodiments, the user interface 404 presents a recommendation further based on a return-on-investment analysis associated with acquiring the acquisition candidate. In some embodiments, the acquisition management system 402 also, or alternatively, outputs the recommendation as a report 420 in any of a variety of electronic and/or hard copy formats.

Figure 5:
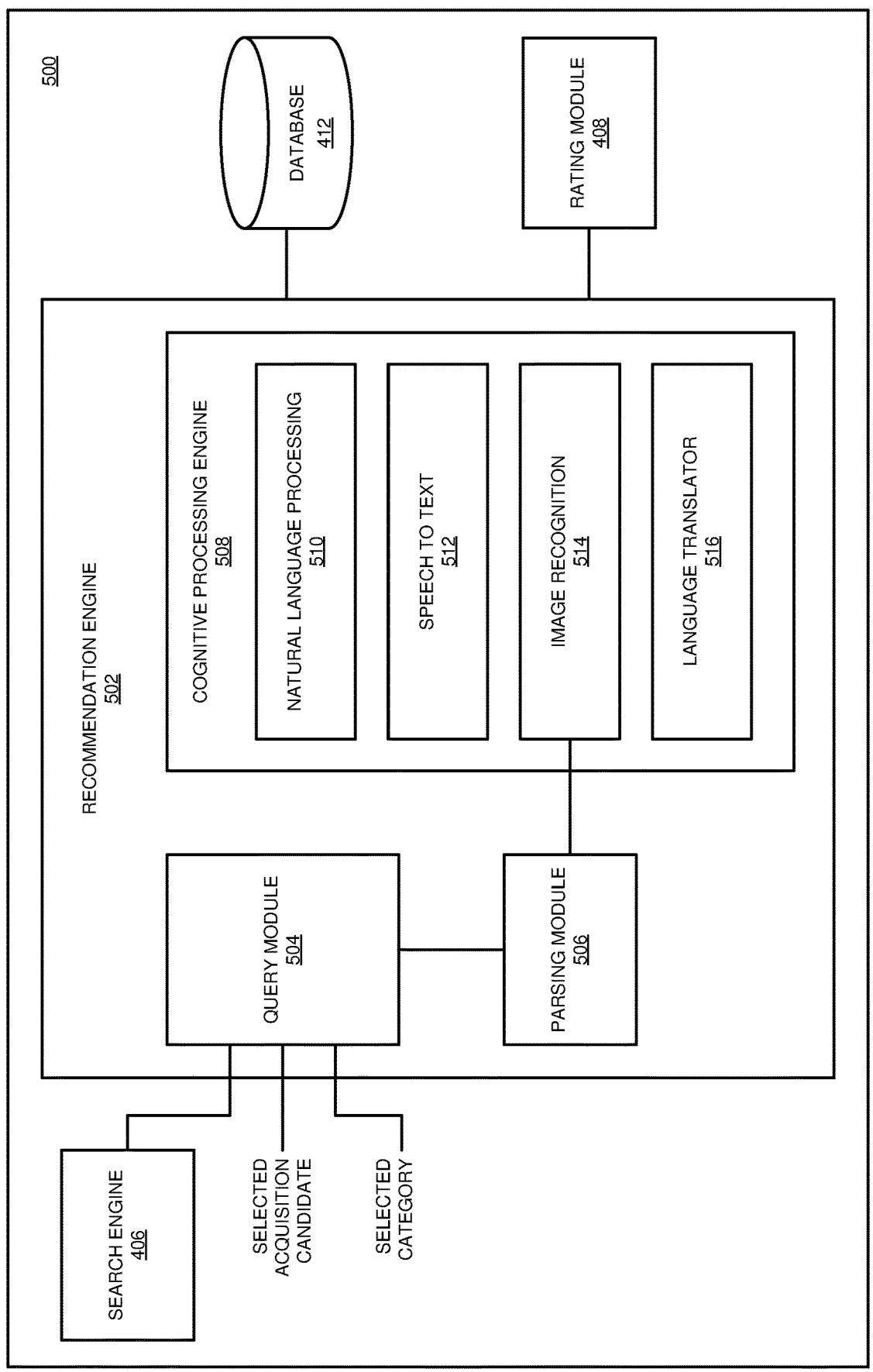
FIG. 5 depicts a block diagram of an exemplary system that includes a recommendation engine in accordance with an illustrative embodiment.

With reference to FIG. 5, this figure depicts a block diagram of an exemplary system 500 that includes a recommendation engine 502 in accordance with an illustrative embodiment. In an exemplary embodiment, the recommendation engine 502 is an example of the recommendation engine 414 of FIG. 4.

In some embodiments, the recommendation engine 502 includes a query module 504, a parsing module 506, and a cognitive processing engine 508. In alternative embodiments, the recommendation engine 502 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In an exemplary embodiment, the recommendation engine 502 uses collected data from the search results as input parameters for a cognitive analysis, and the recommendation engine 502 conducts detailed searches based on the input parameters. For example, in some embodiments, the query module 504 initiates the search engine 406 to conduct another search of the data source 418 (shown in FIG. 4) for information associated with a selected acquisition candidate using search criteria extracted from the information dataset associated with the acquisition candidate. In some embodiments, the query module 504 receives search results from the search engine 406, where the search results constitute due-diligence data associated with one or more of the due-diligence tasks on the due-diligence requirements checklist.

In an exemplary embodiment, the query module 504 provides the search results to the parsing module 506, which uses one or more different data parsing and analysis techniques to process the search results. For example, in some embodiments, the parsing module 506 identifies data types in the search results and provides the identified data to the cognitive processing engine for cognitive processing compatible with the identified data type. For example, in the illustrated embodiment, the cognitive processing engine 508 includes a natural language processing module 510, a speech to text module 512, an image recognition module 514, and a language translator 516. In some such embodiments, the natural language processing module 510 performs cognitive analysis that includes natural language processing (NLP) of a natural language portion of the due-diligence data, speech to text module 512 performs speech data analysis of audio from audio and/or video included in the due-diligence data, and image recognition module 514 performs image analysis of an images included in the due-diligence data. In some embodiments, the language translator 516 translates text in the due-diligence data received directly from the parsing module 506 or from another processing module of the cognitive processing engine 508, for example from the natural language processing module 510 or from the text module 512. In some embodiments, the language translator 516 may translate text extracted from an image by the image recognition module 514.

In some embodiments, the recommendation engine 502 assigns a weight for each of the information categories based on user input and/or characteristics of the acquisition candidate. Such characteristics will be largely implementation-specific according to which categories are desirably emphasized for a given acquisition candidate. In some embodiments, the recommendation engine 502 derives a percentage of the items that the acquisition candidate has satisfied from the due-diligence requirements checklist.

In some embodiments, the recommendation engine 502 uses the rating module 408 to calculate updated scores for the acquisition candidate for each of the information categories and adjusts the scores based on the weight assigned to each category. For example, in some embodiments, the recommendation engine 502 provides information that is specific to different categories to the rating module 408 such that the data is organized by category to allow the rating module 408 to calculate sub-ratings for respective categories. In some such embodiments, the recommendation engine 502 interacts with the rating module 408 to determine an updated candidate rating for the acquisition candidate based on based on updated candidate sub-ratings for the acquisition candidate. In some such embodiments the updated candidate sub-ratings are based on a cognitive analysis of the due-diligence data and the weight assigned to the associated information category.

Figure 6:
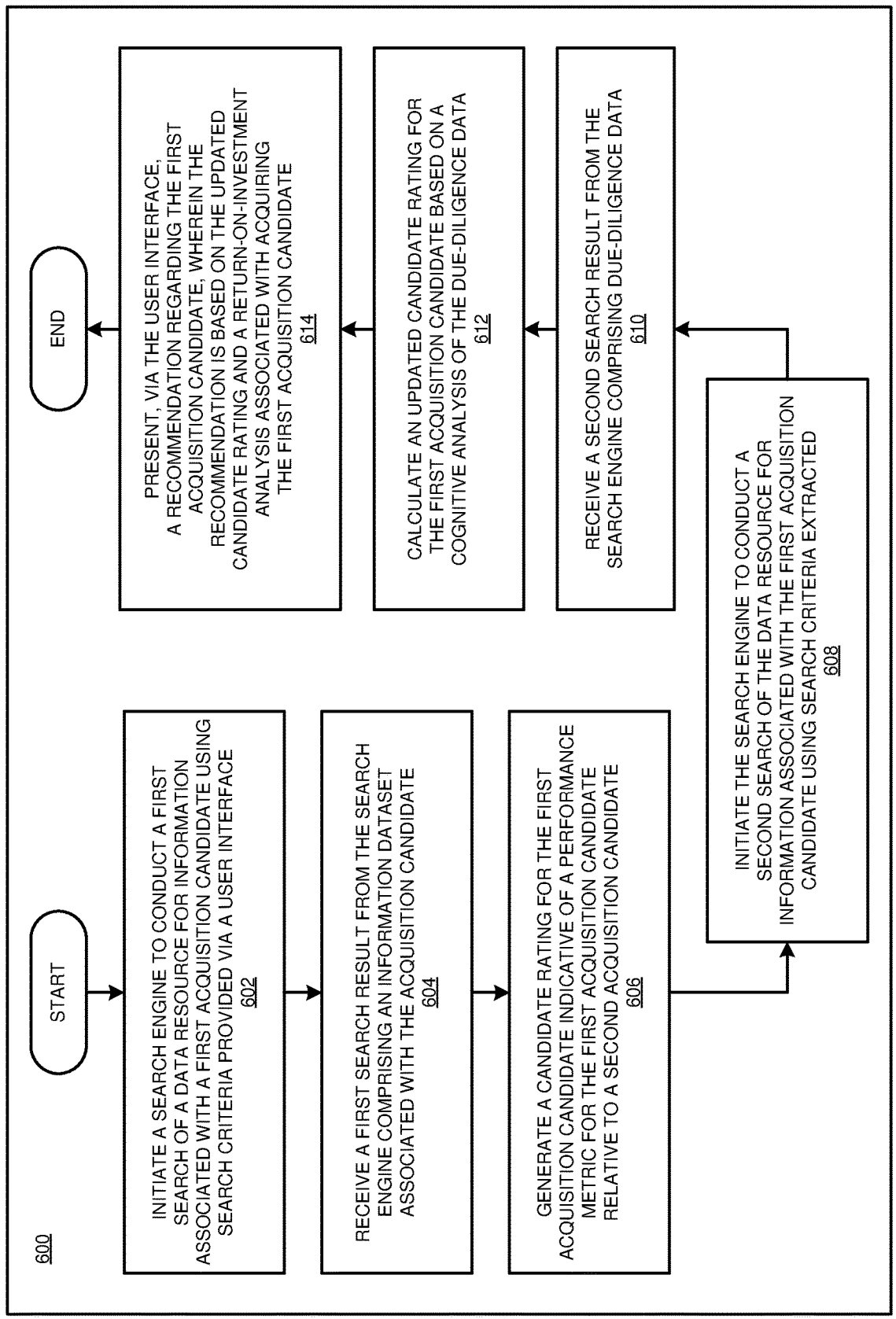
FIG. 6 depicts a flowchart of an example process for cognitive evaluation of acquisition candidates in accordance with an illustrative embodiment.

With reference to FIG. 6, this figure depicts a flowchart of an example process 600 for cognitive evaluation of acquisition candidates in accordance with an illustrative embodiment. In a particular embodiment, the acquisition management system 402 carries out the process 600.

In an embodiment, at block 602, the process initiates a search engine to conduct a first search of a data resource for information associated with a first acquisition candidate using search criteria provided via a user interface. Next, at block 604, the process receives a first search result from the search engine comprising an information dataset associated with the acquisition candidate. Next, at block 606, the process generates a candidate rating for the first acquisition candidate indicative of a performance metric for the first acquisition candidate relative to a second acquisition candidate. Next, at block 608, the process initiates the search engine to conduct a second search of the data resource for information associated with the first acquisition candidate using search criteria extracted from the information dataset associated with the acquisition candidate. Next, at block 610, the process receives a second search result from the search engine comprising due-diligence data. Next, at block 612, the process calculates an updated candidate rating for the first acquisition candidate based on a cognitive analysis of the due-diligence data. Next, at block 614, the process presents, via the user interface, a recommendation regarding the first acquisition candidate, wherein the recommendation is based on the updated candidate rating and a return-on-investment analysis associated with acquiring the first acquisition candidate.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A processor-implemented method comprising:
    initiating, by a cloud-based acquisition management system responsive to an application programming interface (API) request from a client device, a search engine to conduct a first search of a data resource for information associated with a first acquisition candidate using search criteria provided via a user interface of the acquisition management system;

storing, by the acquisition management system in a database, a first search result from the search engine comprising an information dataset associated with the acquisition candidate;

generating, by the acquisition management system using the first search result stored in the database, a candidate rating for the first acquisition candidate indicative of a performance metric for the first acquisition candidate relative to a second acquisition candidate;

generating, by the acquisition management system responsive to receiving a selection of the acquisition candidate from the client device, a due-diligence checklist that includes a due-diligence task from a repository of predefined task templates;

initiating, by the acquisition management system, the search engine to conduct a second search of the data resource for information associated with the first acquisition candidate using search criteria extracted from the information dataset stored in the database associated with the acquisition candidate;

receiving, by the acquisition management system, a second search result from the search engine comprising due-diligence data associated with the due-diligence task of the due-diligence checklist;

generating, by a parsing module of the acquisition management system, using a data parsing technique, identified data by identifying a data type of data in the second search result;

providing, by the parsing module, the identified data to a cognitive processing engine of the acquisition management system;

associating, by the cognitive processing engine, the identified data with one of a plurality of cognitive analyses based on the identified data type;

analyzing, by the cognitive processing engine, the identified data using the associated one of the plurality of cognitive analyses;

calculating, by the acquisition management system, an updated candidate rating for the first acquisition candidate based on the cognitive analysis of the due-diligence data; and presenting, via the user interface, a recommendation regarding the first acquisition candidate, wherein the recommendation is based on the updated candidate rating and a return-on-investment analysis associated with acquiring the first acquisition candidate.

2. The method of claim 1, wherein the information dataset includes a plurality of information categories.

3. The method of claim 2, wherein the plurality of information categories includes at least one of a financial performance category, an online presence category, a workforce statistics category, an industry category, and a market data category.

4. The method of claim 2, wherein the candidate rating is based on a plurality of candidate sub-ratings for the first acquisition candidate.

5. The method of claim 4, wherein each of the plurality of candidate sub-ratings is associated with a respective one of the plurality of information categories.

6. The method of claim 5, further comprising presenting, via the user interface, the candidate rating for the first acquisition candidate.

7. The method of claim 6, further comprising presenting, via the user interface, the plurality of candidate sub-ratings and associated information categories for the first acquisition candidate.

8. The method of claim 6, further comprising receiving, via the user interface, the selection of the first acquisition candidate for further research.

9. The method of claim 8, further comprising identifying a key performance indicator (KPI) for the first acquisition candidate based on the cognitive analysis of the due-diligence data.

10. The method of claim 2, wherein the calculating of the updated candidate rating for the first acquisition candidate is based on updated candidate sub-ratings for the first acquisition candidate.

11. The method of claim 10, wherein each of the updated candidate sub-ratings is associated with a respective one of the plurality of information categories.

12. The method of claim 11, further comprising assigning respective weight values to each of the information categories.

13. The method of claim 12, wherein each of the updated candidate sub-ratings is based on the cognitive analysis of the due-diligence data and the weight of the respective associated information category.

14. The method of claim 1, wherein the cognitive analysis includes natural language processing (NLP) of a natural language portion of the due-diligence data.

15. The method of claim 1, wherein the cognitive analysis includes image analysis of an image included in the due-diligence data.

16. A computer program product comprising one or more computer readable storage media, and program instructions collectively stored on the one or more computer readable storage media, the program instructions executable by a processor to cause the processor to perform operations comprising:

initiating, by a cloud-based acquisition management system responsive to an application programming interface (API) request from a client device, a search engine to conduct a first search of a data resource for information associated with a first acquisition candidate using search criteria provided via a user interface of the acquisition management system;

storing, by the acquisition management system in a database, a first search result from the search engine comprising an information dataset associated with the acquisition candidate;

generating, by the acquisition management system using the first search result stored in the database, a candidate rating for the first acquisition candidate indicative of a performance metric for the first acquisition candidate relative to a second acquisition candidate;

generating, by the acquisition management system responsive to receiving a selection of the acquisition candidate from the client device, a due-diligence checklist that includes a due-diligence task from a repository of predefined task templates;

initiating, by the acquisition management system, the search engine to conduct a second search of the data resource for information associated with the first acquisition candidate using search criteria extracted from the information dataset stored in the database associated with the acquisition candidate;

receiving, by the acquisition management system, a second search result from the search engine comprising due-diligence data associated with the due-diligence task of the due-diligence checklist;

generating, by a parsing module of the acquisition management system, using a data parsing technique, identified data by identifying a data type of data in the second search result;

providing, by the parsing module, the identified data to a cognitive processing engine of the acquisition management system;

associating, by the cognitive processing engine, the identified data with one of a plurality of cognitive analyses based on the identified data type;

analyzing, by the cognitive processing engine, the identified data using the associated one of the plurality of cognitive analyses;

calculating, by the acquisition management system, an updated candidate rating for the first acquisition candidate based on the cognitive analysis of the due-diligence data; and presenting, via the user interface, a recommendation regarding the first acquisition candidate, wherein the recommendation is based on the updated candidate rating and a return-on-investment analysis associated with acquiring the first acquisition candidate.

17. The computer program product of claim 16, wherein the stored program instructions are stored in a computer readable storage device in a data processing system, and wherein the stored program instructions are transferred over a network from a remote data processing system.

18. The computer program product of claim 16, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

19. A computer system comprising a processor and one or more computer readable storage media, and program instructions collectively stored on the one or more computer readable storage media, the program instructions executable by the processor to cause the processor to perform operations comprising:

initiating, by a cloud-based acquisition management system responsive to an application programming interface (API) request from a client device, a search engine to conduct a first search of a data resource for information associated with a first acquisition candidate using search criteria provided via a user interface of the acquisition management system;

storing, by the acquisition management system in a database, a first search result from the search engine comprising an information dataset associated with the acquisition candidate;

generating, by the acquisition management system using the first search result stored in the database, a candidate rating for the first acquisition candidate indicative of a performance metric for the first acquisition candidate relative to a second acquisition candidate;

generating, by the acquisition management system responsive to receiving a selection of the acquisition candidate from the client device, a due-diligence checklist that includes a due-diligence task from a repository of predefined task templates;

initiating, by the acquisition management system, the search engine to conduct a second search of the data resource for information associated with the first acquisition candidate using search criteria extracted from the information dataset stored in the database associated with the acquisition candidate;

receiving, by the acquisition management system, a second search result from the search engine comprising due-diligence data associated with the due-diligence task of the due-diligence checklist;

generating, by a parsing module of the acquisition management system, using a data parsing technique, identified data by identifying a data type of data in the second search result;

providing, by the parsing module, the identified data to a cognitive processing engine of the acquisition management system;

associating, by the cognitive processing engine, the identified data with one of a plurality of cognitive analyses based on the identified data type;

analyzing, by the cognitive processing engine, the identified data using the associated one of the plurality of cognitive analyses;

calculating, by the acquisition management system, an updated candidate rating for the first acquisition candidate based on the cognitive analysis of the due-diligence data; and presenting, via the user interface, a recommendation regarding the first acquisition candidate, wherein the recommendation is based on the updated candidate rating and a return-on-investment analysis associated with acquiring the first acquisition candidate.

* * * * *